(12) United States Patent
Stime, Jr.

(10) Patent No.: US 9,516,867 B2
(45) Date of Patent: Dec. 13, 2016

(54) WATER CIRCULATION DEVICE FOR JELLYFISH AQUARIUM

(71) Applicant: James Stime, Jr., Thousand Oaks, CA (US)

(72) Inventor: James Stime, Jr., Thousand Oaks, CA (US)

(*) Notice: Subject to any disclaimer, the term of this patent is extended or adjusted under 35 U.S.C. 154(b) by 35 days.

(21) Appl. No.: 14/790,463

(22) Filed: Jul. 2, 2015

(65) Prior Publication Data

US 2016/0000053 A1    Jan. 7, 2016

Related U.S. Application Data

(60) Provisional application No. 62/020,021, filed on Jul. 2, 2014.

(51) Int. Cl.
*A01K 61/00* (2006.01)
*A01K 63/04* (2006.01)

(52) U.S. Cl.
CPC .............. *A01K 63/047* (2013.01); *A01K 61/00* (2013.01)

(58) Field of Classification Search
CPC ...... A01K 63/045; A01K 61/00; A01K 63/00; A01K 63/006; A01K 63/047
USPC .............. 119/260, 245, 259, 248, 261, 226, 227,119/251, 255, 263, 265, 269
See application file for complete search history.

(56) References Cited

U.S. PATENT DOCUMENTS

| | | | | |
|---|---|---|---|---|
| 5,171,438 A | * | 12/1992 | Korcz | A01K 63/045 119/260 |
| 5,245,945 A | * | 9/1993 | Liao | A01K 63/045 119/248 |
| 6,276,302 B1 | * | 8/2001 | Lee | A01K 63/003 119/248 |
| 7,029,577 B2 | * | 4/2006 | Cummins | A01K 63/00 119/226 |

(Continued)

FOREIGN PATENT DOCUMENTS

JP    H10-234250    9/1998

OTHER PUBLICATIONS

Raskoff et al., "Planktonkreisel design from the article: Capture and rearing techniques for gelatinous zooplankton", (2003) Biological Bulletin, 204, 68-80, http://www.mbari.org/midwater/tank/tank.htm, 2 pages, printed from the internet on Sep. 1, 2015.

(Continued)

*Primary Examiner* — Yvonne Abbott-Lewis
(74) *Attorney, Agent, or Firm* — Chen Yoshimura LLP

(57) ABSTRACT

A water circulation and filtration device for jellyfish aquarium, designed to be suspended from a top opening of the aquarium and partially submerged in water. It includes a pump house basket and a lid on top. The pump house basket has polygonal shape in horizontal cross sections, and tapered or straight in vertical cross sections. The pump house basket is divided into an intake chamber at the bottom with multiple inlet slits on its sides, a pump house chamber above the intake chamber to accommodate a pump, and a sealed return chamber around the pump house chamber. The sidewall of the pump house basket has a step feature which includes a plurality of flute style outlets disposed along the outside surface of the pump house basket above the inlet slits. The pump draws from the intake chamber and discharges to the return chamber and water is discharged via the outlets.

9 Claims, 2 Drawing Sheets

(56) References Cited

U.S. PATENT DOCUMENTS

| | | | | |
|---|---|---|---|---|
| 7,578,262 B2* | 8/2009 | Vaccari | ............... | A01K 63/045 |
| | | | | 119/259 |
| 7,604,734 B2* | 10/2009 | Smith | ................... | A01K 63/04 |
| | | | | 119/260 |
| 7,610,878 B2* | 11/2009 | Stime, Jr. | ............ | A01K 63/003 |
| | | | | 119/245 |
| 7,631,616 B2* | 12/2009 | Hsieh | ................... | A01K 63/042 |
| | | | | 119/259 |
| 8,033,252 B2* | 10/2011 | Allis | ................... | A01K 63/042 |
| | | | | 119/261 |
| 8,393,298 B2* | 3/2013 | Andon | ................ | A01K 63/003 |
| | | | | 119/245 |
| 8,453,605 B2* | 6/2013 | Tominaga | ............ | A01K 63/045 |
| | | | | 119/259 |
| 8,726,840 B2* | 5/2014 | Furgalus | ............. | A01K 63/045 |
| | | | | 119/245 |
| 8,851,015 B2* | 10/2014 | Furgalus | ............... | A01K 63/04 |
| | | | | 119/245 |

OTHER PUBLICATIONS

Envision Acrylics, "Jellyfish Tanks", http://www.envisionacrylics.com/jellyfish.html, 1 page, printed from the internet on Sep. 1, 2015.

\* cited by examiner

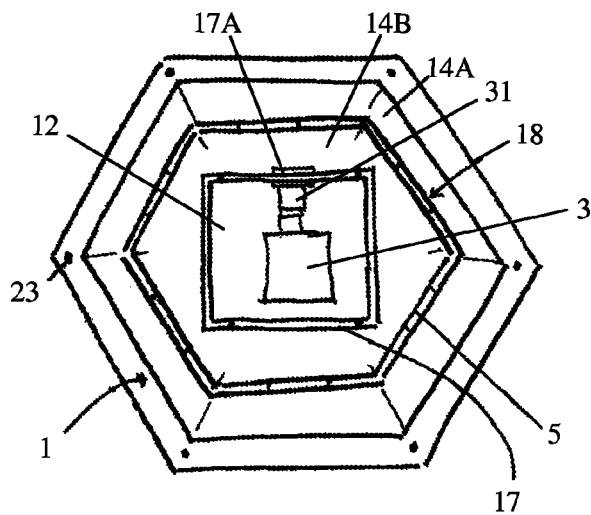
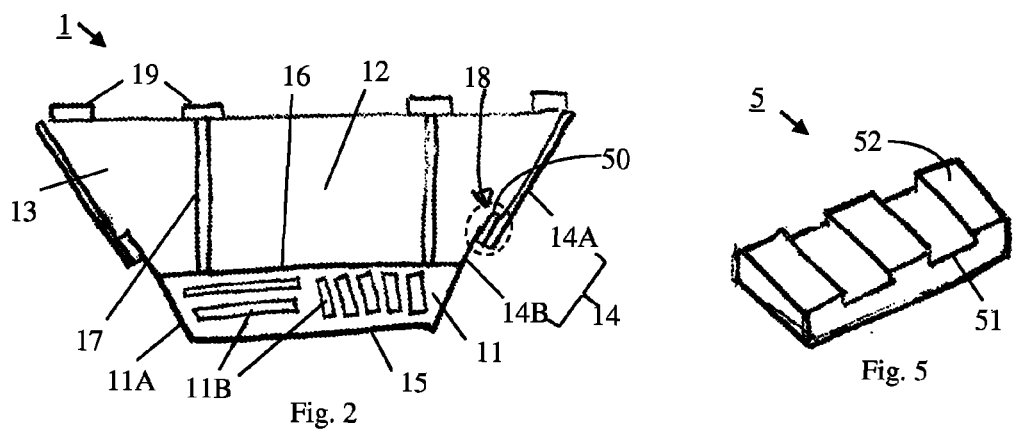
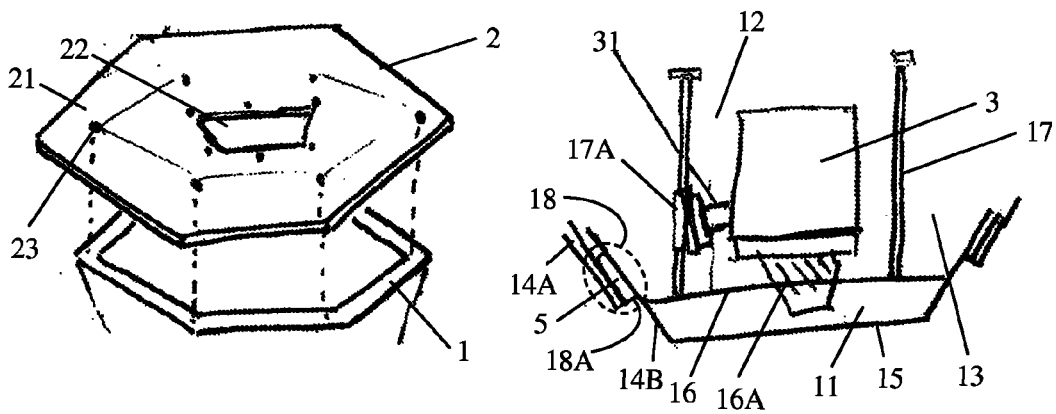

WATER CIRCULATION DEVICE FOR JELLYFISH AQUARIUM

BACKGROUND OF THE INVENTION

Field of the Invention

This invention relates to a water circulation and filtration device to be used with an aquarium tank, in particular a tank for keeping jellyfish.

Description of Related Art

Aquariums or water tanks suitable for keeping and displaying jellyfish and other plankton species have been known. These aquariums require special designs as jellyfish are delicate. Some such aquarium designs are described in: (1) Japanese Patent Publication H10-234250, (2) webpage description at http://www.mbari.org/midwater/tank/tank.htm, entitled: "Planktonkreisel design from the article: Capture and rearing techniques for gelatinous zooplankton, (2003) Biological Bulletin, 204, 68-80, by K. A. Raskoff, F. A. Sommer, W. M. Hamner and K. M. Cross," and (3) webpage description at http://www.envisionacrylics.com/jellyfish.html, entitled "Jellyfish Tanks", by Envision Acrylics. Such aquariums are designed to provide a living environment suitable for jellyfish and other plankton species, including providing water circulation inside the tank and using a discharge port that prevents the plankton bodies from being damaged by the water flow from the discharge port.

U.S. Pat. No. 7,610,878 to the same inventor as the present patent application also discloses an aquarium for jellyfish.

SUMMARY

The present invention is directed to a water filtration and circulation device to be used with an aquarium tank, in particular a tank for keeping jellyfish.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a water circulation device for an aquarium tank, which includes: a pump house basket having a sidewall and a horizontal bottom panel joined to the sidewall, the sidewall having a polygonal or circular shape in a horizontal cross-section; and a basket lid disposed on top of the pump house basket, the pump house basket further including a horizontal divider panel disposed above the bottom panel and joined to the sidewall, wherein the bottom panel, the horizontal divider panel and a portion of the sidewall located between the bottom panel and the horizontal divider panel enclose an intake chamber, wherein the portion of the sidewall located between the bottom panel and the horizontal divider panel have a plurality of openings forming inlets of the intake chamber, the pump house basket further including substantially vertical divider walls located above the horizontal divider panel which enclose a pump house chamber adapted for accommodating a water pump, wherein the horizontal divider panel has an opening formed thereon adapted for passing an inlet port of the water pump from the pump house chamber to the intake chamber, wherein the substantially vertical divider walls, a portion of the horizontal divider panel, an upper portion of the sidewall of the pump house basket, and a portion of the basket lid enclose a return chamber, the return chamber surrounding the pump house chamber, wherein the substantially vertical divider walls have an opening formed thereon adapted for passing an outlet port of the water pump from the pump house chamber to the return chamber, and wherein the sidewall of the pump house basket has a step feature extending in horizontal directions around the sidewall, the step feature including a plurality of water outlets, each of the water outlets being parallel to the sidewall and perpendicular to a horizontal direction, wherein the plurality of water outlets are located above the inlets of the intake chamber.

It is to be understood that both the foregoing general description and the following detailed description are exemplary and explanatory and are intended to provide further explanation of the invention as claimed.

BRIEF DESCRIPTION OF THE DRAWINGS

FIG. 1 is a top plan view of a water filtration and circulation device according to an embodiment of the present invention.

FIG. 2 is a side (vertical), partly cross-sectional (the upper portion) and partly perspective (the intake portion at the bottom) view of the water filtration and circulation device.

FIG. 3 is a top perspective view of a part of the water filtration and circulation device.

FIG. 4 a partial side view of the water filtration and circulation device including the water pump.

FIG. 5 illustrates a spacer block for forming flute style outlets according to an embodiment of the present invention.

DETAILED DESCRIPTION OF PREFERRED EMBODIMENTS

Figure 6:
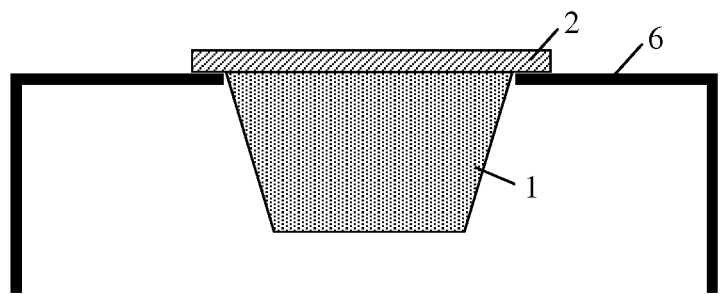
FIGS. 6 and 6A schematically illustrate examples of a water filtration and circulation device mounted over an opening of an aquarium tank.

An embodiment of the present invention provides a water filtration and circulation device designed to be placed through the opening on the top of a water tank. Its water discharge is directed across its own inlets and it creates a water circulation pattern inside the water tank that suspends and rotates the jellyfish. Its low profile maximizes an unrestricted view into a walk-around style of water tank.

As shown in FIGS. 1-4, the water filtration and circulation device includes three components: a pump house basket 1, the basket lid 2, and a water pump 3. The pump house basket 1 is designed to be placed through a top opening of the water tank into the tank and partially submerged in the water. The water pump 3 is disposed inside the pump house basket 1, and the basket lid 2 is used to cover the pump house basket.

The pump house basket 1 has a polygonal outer shape in the top view (FIG. 1) and in horizontal cross-sectional planes. In the illustrated example, the outer shape is an equal sided hexagon. In an alternative embodiment, the pump house basket has a circular cross-section in the top view and horizontal cross-sectional planes. The cross-sectional outer shape of the pump house basket 1 in a vertical plane (see FIG. 2) is generally a trapezoid shape with a step on the side as will be described in more detail later. Thus, the pump house basket 1 can generally be viewed as being formed by multiple (e.g. six, four, etc.) tapered side panels 14 and a flat bottom panel 15. The side panels 14 are tapered inwardly toward the bottom, i.e. the cross-section of the pump house basket 1 is smaller at the bottom than at the top.

The pump house basket 1 is divided into three compartments, namely a water intake chamber 11, a pump house chamber 12 and a water return chamber 13. The three sections are separated by walls with defined openings as will be described in more detail later. The water intake chamber 11 is the entire bottom portion of the pump house basket 1. The sidewalls 11A of the water intake chamber 11 have inlet openings 11B, preferably elongated slits arranged parallel to each other in groups, referred to as inlet slits (FIG. 2). The inlet slits 11B are preferably arranged around the sides of the water intake chamber 11, i.e. they are preferably formed on the lower portions of all side panels 14 of the pump house basket 1. The bottom floor 15 of the intake chamber is preferably solid without any openings. In the illustrated embodiment, some inlet slits 11B are vertical and some are horizontal; other arrangements of inlet slits may be used, e.g., all vertical or all horizontal orientations, slanted orientations, etc. In addition to slit shapes, the inlet openings 11B may also have other shape, such as cross slits, round holes, etc.

The water intake chamber 11 is separate from the pump house chamber 12 by a horizontal divider panel 16 that forms the ceiling of the water intake chamber 11 and the floor of the pump house chamber 12 (as well as the return chamber 13), except for a hole 16A in the horizontal divider panel 16 through which an inlet port of the water pump 3 (e.g. either a part of the water pump itself or an intake tubing connected to the pump) extends to draw water from the intake chamber 11.

The pump house chamber 12 of the pump house basket 1 is located in the center of an upper portion of the pump house basket and serves to accommodate the water pump 3. The cross-sectional shape of the pump house chamber 12 in horizontal planes may be any suitable shape, such as a polygon or a circle; it is a square in the illustrated embodiment (FIG. 1).

The return chamber 13 is the outer portion of the pump house basket 1 located above the intake chamber 11 and surrounding the pump house chamber 12. It is separated from the pump house chamber 12 by substantially vertical divider walls 17 and from the intake chamber by the horizontal divider panel 16. The pump 3 draws water directly from the water intake chamber 11 and discharges water directly into the return chamber 13 via a connecting piece (discharge port) 31 of the pump that passes through an opening 17A of the vertical divider wall 17. The top of the return chamber 13 is closed by the lid 2, forming a sealed chamber except for the outlets 18A (described later) and the pump discharge port.

The return chamber 13 of the pump house basket 1 has a stepped feature 18 on its tapered outer sidewall 14 that contains a series of flute style outlets 18A directed downwards. The discharged water from the outlets 18A moves downward along the outside of the tapered outer wall 14 of the basket 1 and across the inlet slits 11B of the water intake chamber 11.

The flute style outlets 18A are formed by spacer blocks 5, one or multiple on each side of the polygon shaped pump house basket 1. The spacer blocks 5 are sandwiched between an upper sidewall 14A and a lower sidewall 14B of the sidewall panels 14. The upper and lower sidewalls 14A, 14B are parallel to each other and partially overlap over a band-shaped area that extends in the horizontal directions around the side of the pump house basket, and the upper sidewall 14A is larger in diameter than the lower sidewall 14B in the band area, creating a space between the overlapped portions where the spacer blocks 5 are located. The spacer blocks 5 are in tight contact with the upper and lower sidewalls 14A and 14B.

Each spacer block 5 has a number of water channels 51, either inside the block (closed channels, not shown in FIG. 5) or preferably on the surface (open channels or grooves, see FIG. 5).

When assembled, the spacer blocks 5 are oriented so that the side 52 with the open channels 51 contacts the outer surface of the lower sidewall 14B, and the length-wise direction of the channels 51 is parallel to the lower sidewall 14B and substantially perpendicular to the horizontal direction (i.e. the circumferential direction of the basket 1). The outlets 18A are formed by the channels 51 and the outer surface of the lower sidewall 14B.

The width and depth of the channels 51, as well as the number of channels, impact the velocity of the water jet discharged from the channels. The designed velocity may depend on many factors and the optimum designed may be determined empirically.

When water is pumped by the pump 3 into the sealed return chamber 13, it exits the flute style outlets 18A, forming multiple steams of water flowing downwardly along the outside surface of the lower sidewall 14B of the pump house basket 1, and across the inlet slits 11B. One purpose of such a water flow is to push jellyfish away from the inlet slits 11B so that they are not sucked toward the inlet slits. The location of the flute style outlets 18A in the vertical direction is just above the inlet slits 11B on the outside of the pump house basket 1. The relative vertical location of the flute style outlets 18A may influence the water flow pattern created, and the best position may depend on the water flow pattern desired, and may be determined empirically. The illustrated location is only an example.

In the illustrated embodiment, the upper sidewall 14A does not extend significantly below the lower end of the spacer blocks 5. In an alternative embodiment, the lower edge of the upper sidewall 14A can be extended below the lower end of the spacer blocks 5, e.g. to a location in front of the inlet slits 11B, so that it may act as a guard to prevent jellyfish from being sucked into the inlet slits.

A filter material may optionally be placed in the return chamber 13 to filter the water. Any suitable filter media may be used, such as activated carbon, plastic or ceramic bio media, etc. These objects and materials may serve the additional purpose of creating a more even flow and more even water pressure inside the return chamber 13 so that the water stream discharged from the flute style outlets 18A on all sides of the pump house basket 1 are more even.

The basket lid 2 is similar in shape to the outer shape of the pump house basket 1, i.e., it is an equal but multi sided shape, but is larger, so that the basket lid 2 overhangs the pump house basket 1 in a peripheral portion 21. The basket lid 2 lays horizontally on top of the pump house basket 1 and is secured to the pump house basket, e.g. by thumb screws 23. For this purpose, two flanges 19 may be formed at the top of the pump house basket 1, e.g. at the top of the vertical divider walls 17 between the pump house chamber 12 and the return chamber 13 and at the top of the upper sidewall 14A, for mounting the basket lid 2.

The size of the basket lid 2 is sufficiently large to span across the opening in the top of the water tank, such that the peripheral portion 21 of the basket lids rests on the edges of the water tank's opening. This way, the pump house basket 1 can be supported by the basket lid 2 to suspend inside the water tank. The water level within the tank should be above the step feature 18. FIG. 6 schematically illustrates the relationship between the pump house basket 1, the basket lid 2 and the water tank 6 (which is only partially shown) described above. Note that the structural features such as the step feature 18 are not shown in this schematic illustration.

The basket lid 2 preferably has a cut-out 22 in its center that allows for access to the water pump 3 and/or its power cord. The cut-out 22 is smaller than the pump house chamber 12, so that the top opening of the water return chamber 13 is sealed by basket lid 2.

In alternative embodiments, the pump house basket 1 may be secured to the water tank in other ways. For example (not shown in drawings), the basket lid 2 does not substantially overhang the pump house basket 1, but a number of mounting arms are affixed to the basket lid 2 and extent outwardly to rest on the rim of the water tank.

Figure 6A:
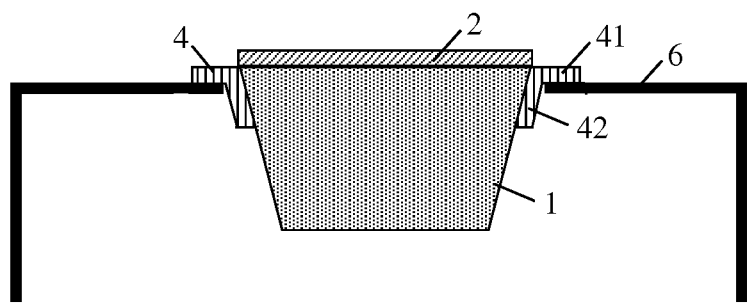

In another alternative embodiment, schematically illustrate in FIG. 6A, a basket holder 4 is used to mount the pump house basket 1 on the water tank 6. The basket holder 4 has a lower portion 42 which has a tapered and multi-sided hollow shape without a bottom, and a flat horizontal flange 41 joined to and extending outwards from the top of the lower portion 42. When assembled, the flange 41 rests on the edges of the opening of the water tank 6 and the lower portion 42 hangs below the flange. The lower portion 42 is shaped such that it matches the tapered outer shape of an upper portion of the pump house basket 1, so that the pump house basket securely rests inside the basket holder 4. In this case, the basket lid 2 does not need to overhang the pump house basket. Again, structural features such as the step feature 18 are not shown in this schematic illustration.

Moreover, the water filtration and circulation device may be used with tanks even if they are not specifically designed to have a top opening matching the size and shape of the pump house basket 1 and the basket lid 2 as shown in FIG. 6 or the basket holder 4 as shown in FIG. 6A. For such tanks, a suitable adapter may be provided which will rest over the top of the tank, and which has an opening that matches the size and shape of the pump house basket 1 and the basket lid 2 or the basket holder 4.

In operation, the pump house basket is partially and mostly submerged in the water inside the water tank, so that both the inlet slits 11B and the flute style outlets 18A are below the water level. The water enters the intake chamber 11 through the inlet slits 11B. The pump 3 draws the water from the intake chamber 11 and pumps it into the sealed return chamber 13. This creates a pressure to eject water out of the flute style outlets 18A, creating a desired water flow. The size of the water filtration and circulation device can depend on the size of the tank it is intended to be used for. When the water filtration and circulation device is placed at the top of an upright cylindrical, hexagonal, square or cube shaped water tank (large to desktop sized), it can create a water flow pattern where the water stream goes downwards in a 'v' pattern to the bottom of the tank, spreads laterally outwards near the bottom of the tank, and goes upwards along the periphery of the cylinder. This kind of flow pattern can create a suitable environment for jellyfish.

While in the embodiments shown and described above the pump house basket 1 has tapered sidewalls, in alternative embodiments the pump house basket may have vertical sidewalls. The rest of the design will be similar to the illustrated embodiments. A pump house basket with vertical sidewalls is easier and thus less costly to manufacture compared to one with tapered sidewalls, but it may be less effective in creating a desired water circulation pattern in the tank.

The various components described above, such as the panels, walls, and the spacer blocks, are preferably made of various plastic materials. The device may be manufacturing in any suitable ways, some of which are described below.

The pump house basket 1 and the basket lid 2 may be shaped by hand. Flat plastic material can be cut, trimmed and glued or welded together to form the equally sided, multi shaped pump house basket 1 and the basket lid 2, including the separating walls 16 and 17. A series of inlet slits or holes are cut into the outer parameter of the intake chamber of the pump house basket 1. Two holes are cut or drilled into the pump house chamber 12, one into its base forming the seat or inlet for the pump, and the other hole in one wall of between the pump house chamber 12 and the return chamber 13 creating the discharge exit from the pump house chamber 12 to the return chamber 13 for the pump. Grooves are cut perpendicular into the spacer blocks 5, which are then placed between the upper and lower portions 14A and 14B of the pump house basket 1 (the stepped feature being the division between the two portions) forming the stepped feature 18 with flute style outlets 18A. The two flanges 19 are glued or welded to the top edges of the pump house basket 1. The basket lid 2 is secured to the top of the pump house basket 1 (e.g. with screws) and provides the sealed return chamber 13.

The pump house basket 1 and the basket lid 2 may be vacuum formed. Flat plastic is heated to a forming temperature, stretched or placed over a convex mold, a suction is applied pulling the material down forming the equally sided, multi shaped upper and lower portions of the pump house basket 1. A flat panel of plastic material is trimmed with a hole in it and the entire wall of the pump house chamber 12, including a hole for the discharge of the pump, is glued or welded in the lower section of pump house basket forming the floor or separation panel between the intake chamber and the pump house chamber.

The pump house basket 1 and the basket lid 2 may also be injection molded. Using a series of molds plastic material forced into a cavity where it cools and hardens to create the equally sided, multi shaped seven sections that form the pump house basket 1, those being the upper and lower portions of the pump house basket, the flute style outlet strips, the separation plate between the intake chamber and the pump house chamber, the pump house chamber walls and the flanges along with the basket lid 2. These molded components are either designed to snap together with tabs or are glued or welded together. There are threaded holes in the Flanges, a series of inlet holes in the lower, outer parameter of the intake chamber of the pump house basket and holes to accommodate the pump mechanisms intake and outlet in the pump house chamber.

It will be apparent to those skilled in the art that various modification and variations can be made in the water filtration and circulation device of the present invention without departing from the spirit or scope of the invention. Thus, it is intended that the present invention cover modifications and variations that come within the scope of the appended claims and their equivalents.

What is claimed is:
1. A water circulation device for an aquarium tank, comprising:
   a pump house basket having a sidewall and a horizontal bottom panel joined to the sidewall, the sidewall having a polygonal or circular shape in a horizontal cross-section; and
   a basket lid disposed on top of the pump house basket, the pump house basket further including a horizontal divider panel disposed above the bottom panel and joined to the sidewall, wherein the bottom panel, the horizontal divider panel and a portion of the sidewall located between the bottom panel and the horizontal divider panel enclose an intake chamber, wherein the portion of the sidewall located between the bottom panel and the horizontal divider panel have a plurality of openings forming inlets of the intake chamber, the pump house basket further including substantially vertical divider walls located above the horizontal divider panel which enclose a pump house chamber adapted for accommodating a water pump, wherein the horizontal divider panel has an opening formed thereon adapted for passing an inlet port of the water pump from the pump house chamber to the intake chamber, wherein the substantially vertical divider walls, a portion of the horizontal divider panel, an upper portion of the sidewall of the pump house basket, and a portion of the basket lid enclose a return chamber, the return chamber surrounding the pump house chamber, wherein the substantially vertical divider walls have an opening formed thereon adapted for passing an outlet port of the water pump from the pump house chamber to the return chamber, and wherein the sidewall of the pump house basket has a step feature extending in horizontal directions around the sidewall, the step feature including a plurality of water outlets, each of the water outlets being parallel to the sidewall and perpendicular to a horizontal direction, wherein the plurality of water outlets are located above the inlets of the intake chamber.

2. The water circulation device of claim 1, wherein the sidewall is tapered inwardly toward a bottom of the pump house basket.

3. The water circulation device of claim 1, wherein the sidewall is substantially vertical.

4. The water circulation device of claim 1, wherein the sidewall has an equal-sided polygonal shape in a horizontal cross-section.

5. The water circulation device of claim 1, wherein the sidewall includes an upper sidewall and a lower sidewall which are parallel to each other and overlap in a band-shaped overlapping area that extends in the horizontal directions, wherein the step feature includes a plurality of spacer blocks sandwiched between the upper sidewall and a lower sidewall in the band-shaped overlapping area, each spacer block having one or more channels which form the water outlets.

6. The water circulation device of claim 5, wherein the channels on each spacer block are grooves formed on a first side of the spacer block, and wherein the first side of the spacer block is in contact with an outer surface of the lower sidewall, wherein the grooves and the outer surface of the lower sidewall form the water outlets.

7. The water circulation device of claim 1, wherein the basket lid has an opening above the pump house chamber.

8. The water circulation device of claim 1, wherein a peripheral portion of the basket lid overhangs the pump house basket.

9. The water circulation device of claim 8, wherein the lid is secured to the pump house basket by screws.

* * * * *